United States Patent [19]

Brunnschweiler et al.

[11] Patent Number: 4,743,190

[45] Date of Patent: May 10, 1988

[54] INJECTION UNIT FOR INJECTION MOLDING OR DIE-CASTING

[75] Inventors: Daniel Brunnschweiler, Oberuzwil; Alfred Hagmann, Speicher; Leo Iten; Leo Strotz, both of Wil; Walter Uhlmann, Mörschwil, all of Switzerland

[73] Assignee: Gebruder Buhler AG, Uzwil, Switzerland

[21] Appl. No.: 920,132

[22] Filed: Oct. 17, 1986

[30] Foreign Application Priority Data

Oct. 24, 1985 [CH] Switzerland ............... 04574/85

[51] Int. Cl.⁴ ............................................. B29C 45/77
[52] U.S. Cl. ............................................. 425/149; 164/155
[58] Field of Search ............... 164/155, 457; 425/155, 425/145, 149, 150; 92/5 R, 85 R, 85 B, 163, 186

[56] References Cited

U.S. PATENT DOCUMENTS

| | | | |
|---|---|---|---|
| 2,893,082 | 7/1959 | Hodler | 164/315 |
| 3,036,337 | 5/1962 | Burnham | 425/257 |
| 3,437,130 | 4/1969 | Johnson et al. | 164/285 |
| 3,536,128 | 10/1970 | Bachelier | 164/314 |
| 3,605,871 | 9/1971 | Whitehead et al. | 164/319 |
| 3,654,549 | 4/1972 | Maurer et al. | 324/208 |
| 3,941,534 | 3/1976 | Hunkar | 425/149 |
| 3,956,973 | 5/1976 | Pomplas | 92/5 R |
| 3,960,201 | 6/1976 | Portalier | 164/312 |
| 4,066,189 | 1/1978 | Toyoaki et al. | 164/155 |
| 4,252,176 | 2/1981 | Page | 425/145 |
| 4,311,185 | 1/1982 | Zimmerman | 164/315 |
| 4,488,589 | 12/1984 | Moore et al. | 164/155 |
| 4,493,362 | 1/1985 | Moore et al. | 164/155 |

FOREIGN PATENT DOCUMENTS 3329705  3/1985  Fed. Rep. of Germany.

Primary Examiner—Willard E. Hoag
Attorney, Agent, or Firm—Merchant, Gould, Smith, Edell, Welter, & Schmidt

[57] ABSTRACT

An injection unit for an injection molding or die-casting machine comprises an injection ram which injects molten material out of an injection sleeve into a mold or die during a filling phase. This injection ram is connected to a drive piston which is movable within a drive cylinder for actuating the injection ram. The whole ram unit, comprising the injection ram and the drive piston, consists of at least two parts releasably connected together. A control device for the movement of the injection ram during the different phases of injection comprises a control valve. A signal transfer arrangement is interconnected between this control valve and the ram unit which is provided with a damping arrangement so that its releasably connected parts are movable relative to each other.

25 Claims, 4 Drawing Sheets

INJECTION UNIT FOR INJECTION MOLDING OR DIE-CASTING

FIELD OF THE INVENTION

This invention relates to an injection unit for injection molding or die-casting which comprises an injection ram. Ordinarily, this injection ram (in the form of an extruding screw in the case of an injection molding machine, or of a piston in the case of a die-casting machine) injects molten material contained in an injection sleeve into the cavity of a mold during the so called filling phase. To this end, the injection ram is driven by a drive piston movable within a drive cylinder, and the ram unit comprising the drive piston and the injection ram consists of at least two parts releasably connected together. When the mold cavity is filled up, a sudden increase of the resistance will occur, and it is accordingly necessary to control the movement of the ram unit by a controlling arrangement during the filling phase and the following squeezing phase in which the resistance against further injection is increased. This controlling arrangement comprises a control valve connected to the drive cylinder, According to another aspect, the invention relates to an improved damping device in an injection piston.

BACKGROUND OF THE INVENTION

An injection unit of the type described has become known from DE-A-33 29 705. In this patent, a die-casting machine is described, the injection piston of which being releasably connected with its associated piston rod by screws, thus providing a ram unit consisting of two parts between which pressure sensors have been interposed. The output signals of these pressure sensors, however, could only be used for measuring and indicating purposes, but not for a control, particularly not for the control of the transition from the filling phase to the squeezing phase. The reason is that with such an arrangement, the output signals of these pressure sensors can only indicate subsequently the fact that an event, e.g. the end of the filling phase, has happened at a certain moment and is terminated. Of course, for controlling purposes, a certain forecast is necessary and a time lag is needed for emitting and executing a corresponding control command. In the pertinent literature, it has already repeatedly been described what happens when the injection piston tries to move forward with full velocity at that moment in which the die or mold is fully filled up. This effect is often called "water hammer" which results in a slight opening of the two mold halves under the sudden high pressure known as the so-called "die-venting"), so that the molten metal gets into the, thus formed, interspace between the two mold halves. This leads to a bad quality of the product on account of flashes formed on it, or even to waste.

SUMMARY OF THE INVENTION

It is an object of the invention to counteract "water hammer" or "die-venting", and to provide a control facility which automatically takes care of a corresponding change over of the control valve.

This object is attained according to the invention by providing the ram unit, consisting of an injection ram and a drive piston, with a damping device, so that these two parts of the ram unit are movable relative to each other, and in which a signal transfer arrangement is provided between the damping device and the control valve for changing over the latter.

Damping devices for a ram unit, consisting of an injection ram and a drive piston are well known in the art. Reference is made to U.S. Pat. Nos. 2,893,082; 3,036,337; 3,437,130; 3,536,128; 3,605,871 or 3,960,201 by way of example. In such arrangements, the damping device is either located more at the side of the drive piston or more towards the injection ram. For achieving a damping action, mechanical springs and/or a damping fluid (e.g. a gas, but mostly a liquid) is provided. All these and similar damping devices may be used within the scope of the invention, because they allow a control in good time due to the relative displacement of its parts, which are movable relative to each other, when the filling operation is terminated. In this way, the above-mentioned effects can be avoided which heretofore led often to waste. In order to realize apropriate control, a signal transfer arrangement between the ram unit and the control valve has to be provided. It should be noted, however, that such a signal transfer arrangement could, in principle, also be used to change over from the pre-filling phase to the filling phase, if a narrowed runner is provided at the entrance of the mold cavity, which leads to a suddenly increasing resistance of the material. Since such a narrowed runner is not always provided, it is preferable to control the change over of the control valve into its squeeze initiating position at the transition from the filling phase to the squeezing phase. As is known and will be explained later, the back-pressure level—caused by said resistance—is much higher at the last-mentioned transition.

Although it has been mentioned that, in principle, any of the known damping devices can be used, it is preferred, if the damping device, which particularly is arranged within the injection ram, comprises a damping fluid, especially a liquid; this fluidflowing into a chamber of the unit through at least one valve opening. Such damping devices have proved most favorable, and it is preferred, if the fluid is flowing in a circulation path that enables simultaneously a cooling effect. Such a damping device is described in U.S. Pat. No. 4,311,185 the entire disclosure of which being incorporated herein by way of reference. It is also favorable for the purpose of the present invention, if—in accordance with the last-mentioned U.S. Patent—at least one variable throttle is provided on the flow-off side of a pressure or damping chamber of variable volume within the injection ram, and a valve body is arranged on the flow-in side between the pressure chamber and the source of fluid, because in this way, various favorable properties of such a damping arrangement are combined in a beneficial manner. In addition to the possibility of a signal transfer, a considerable profit of time for this transfer is achieved together with a cooling action; the throttle may easily be designed in such a way that there is enough time for transferring the signals or control commands to the control valve in time.

It has been found that especially distinct and unambiguous signals are obtained for the control, if the valve body is also arranged at the flow-off side behind the throttle (when seen in the direction of the flow). In such a case, the valve body locks the flow-in side, as well as the flow-off side for the damping fluid during the filling phase, so that the injection ram forms a rigid unit together with its rod through the fluid enclosed in the pressure chamber during this phase. This results in a more distinct signal pattern, as compared with other phases where the valve body assumes another position. The reason is that the fluid is under a final pressure at the end of the filling phase which is considerably above the pressure during the filling phase, but when the final pressure attains a predetermined value the fluid is allowed to flow off the pressure chamber through the throttle. In this connection, it is favorable if the valve body is formed as an immersion slide valve which is displaceable within a bore of an inner piston mounted on the rod of the ram and defining the pressure chamber. This immersion valve body is movable from an neutral position, in which a supply line is connected to the pressure chamber and the latter is connected to the source of pressure medium through the variable throttle disposed at the flow-off side in a section thereof which is adjacent the pressure chamber, into a further position in which the fluid connection between the pressure chamber und the supply line is interrupted. Suitably, rigid abutment members are respectively arranged on the immersion slide valve and the inner piston in such a way that the immersion slide valve is displaceable from its neutral position into two different operating positions, the first of which being defined by further abutment members, i.e. a pressure-loaded abutment member in the path of the immersion slide valve and a pertinent abutment surface on the inner piston, the second operating position being defined by rigid abutment surfaces on the inner piston. Such a design warrants a sure operation (in the above-mentioned sense) by a simple construction.

According to a preferred embodiment of the last-mentioned design, the supplyline for the damping fluid comprises a supply channel, extending in axial direction of the rod of the ram, which is in connection with an axial bore in the immersion slide valve through one or more bore holes in the pressure-loaded abutment member, in the neutral position of the immersion slide valve the axial bore discharging into the pressure chamber through a branch conduit at the end of the immersion slide valve adjacent the pressure chamber and an assigned radial widening of a bore receiving the immersion slide valve. Preferably, the pressure-loaded abutment member is axially displaceable between two rigid abutment surfaces against the force of a springy arrangement or spring situated in a first cylindrical chamber of the inner piston, said first chamber joining to the bore receiving the immersion slide valve through a second cylindrical chamber.

Additionlaly or alternatively it is of advantage, if an annular chamber of variable volume is defined by the inner piston and a cup-shaped piston member of the injection ram and is located in a range of movement of the inner piston which is adjacent to the pressure chamber. This annular chamber may be immediately connected to the pressure chamber through the variable throttle and forms a section of the flow-off system of the damping fluid. Furthermore, channels in the inner piston and two corresponding annular grooves on the peripheral surface of the immersion slide valve are provided. With such a construction, it is preferred, if a section of the flow-off conduit by-passes the immersion slide valve within the inner piston, said section leading from the annular chamber to the above-mentioned first cylindrical chamber through a first bore, and from the first cylindrical chamber through at least one second bore into a further chamber which is connected to a flow-off conduit which feeds back to the source of fluid within the rod of the ram. In this case, it is suitable when the pressure-loaded abutment member has an outer conical sealing surface facing the first bore. In this way, the fluid can flow out of the annular chamber without substantial time lag, which fact is beneficial for the pattern of the control signal for the control valve.

In any case, it is of advantage, if the throttle is formed by at least one axially extending notch of diminishing depth which is preferably U-shaped or V-shaped. Independently upon whether a signal transfer arrangement, a pertinent control and a control valve are provided, it is preferred to arrange the axial notch in the interior of the cup-shaped piston member, because in this way, it is generally easier possible to adapt the damping characteristic to the respective requirements by exchanging the piston member by another one which has a notch of other dimensions. Such a cup-like piston member is cheap and simple to exchange, since it merely represents in any case a part subject to wear. However, this is of particular benefit in connection with the signal transfer to the control valve, because the ram can also easily be adapted to the control requirements.

BRIEF DESCRIPTION OF THE DRAWING

Further details will become apparent from the following description of embodiments schematically illustrated in the drawing, in which:

FIG. 1 shows all parts of an injection unit which are necessary for an explanations of its operation, to which

DETAILED DESCRIPTION OF THE DRAWING

Figure 1:
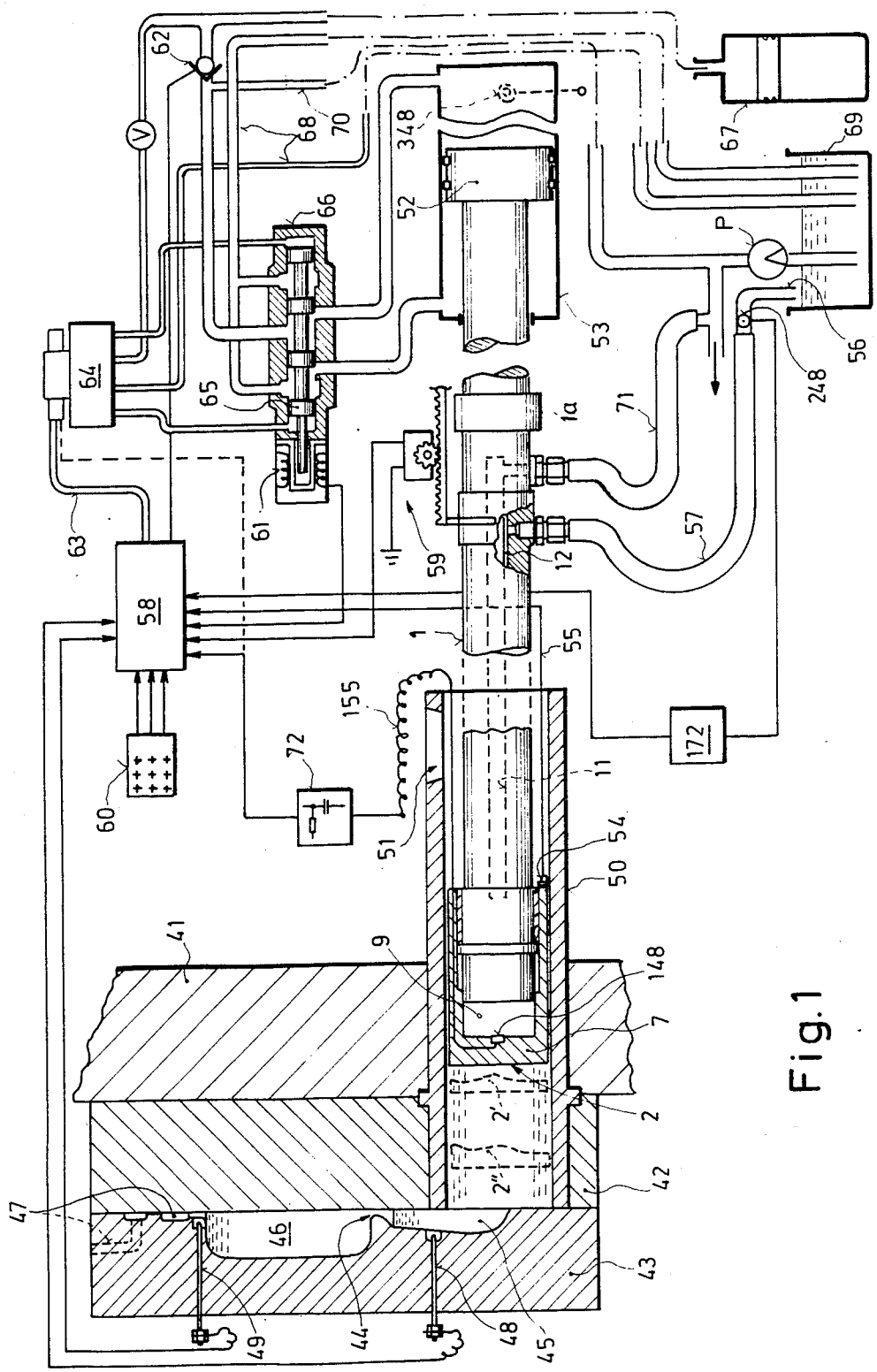

In the general view of FIG. 1, there is a die support platen 41 for a stationary die 42 which is engaged by a movable die 43, when the same is in its operative position, the drive for moving the die 43 being known and, therefore, being not shown. The die 43 has a runner 45, frequently ending in a constricted area 44, and discharging into a mold cavity 46 from which the enclosed air can evade through venting channels 47. Within the die 43, sensors 48 and 49 may be arranged, by which the arrival of molten material may be detected at the respective location. In practice, such sensors are suitably formed by contact sensors, i.e. by one or two electrodes of a circuit which is closed by the molten metal flowing into the runner 45 and the cavity 46 (whereby the circuit is either closed between two electrodes or between one electrode and the metal of the die 43 itself). However, in view of the explanation made later in connection with FIG. 2, it should be supposed that at least the sensor 48 is a pressure sensor.

Whereas in the case of injection molding machines, mostly a barrel for an injection screw forms the injection sleeve, for a die-casting machine, as in the present case, it is usual to provide an injection cylinder 50 in which an injection piston 2 is displaceable as an injection ram. Metal is filled through a filling aperture 51, when the piston 2 in the cylinder 50 is withdrawn to the right (with respect to FIG. 1), and then the piston 2 is actuated by means of a drive piston 52 of a drive cylinder unit 53. Drive piston 52, the piston rod 1 and the piston 2 form a ram unit consisting of at least two parts movable relative to each other, as described later.

In the following, the piston 2 moves during a first injection phase until it covers the filling aperture 51, which forms the first part of the so-called pre-filling phase that ends, when the melt arrives at a location about in the region of the constricted area 44 or shortly before in the manner shown in FIG. 1. If there is a constricted area 44, there will be an increased resistance against further injection. Then, the filling phase is starting, in which the cavity 46 is filled with enhanced (average) speed of the piston 2, until the cavity 46 is entirely filled up, so that only the very narrow venting channels 47 remain open. This may be at the location 2' of the piston 2 shown in dotted lines, or somewhat later, whereby the melt exerts an increased counter-pressure against further injection that is still above the resistance exerted at the transition from the pre-filling phase to the filling phase, since the melt practically cannot give place.

Afterwards, the melt in the interior of the cavity will cool down relatively quickly, whereby the metal shrinks, for which reason the piston 2 has to be kept further under pressure during this so-called "squeezing phase", thus eventually moving to position 2''. In order to absorb the sudden impact exerted on the piston 2 in its position 2', various damping devices have already been developed. One of them, which is particularly advantageous for the purposes of the present invention, is described in the U.S. Pat. No. 4,311,185, one embodiment of which being shown in FIG. 4. Some details of this embodiment should be explained in the following.

Figure 4:
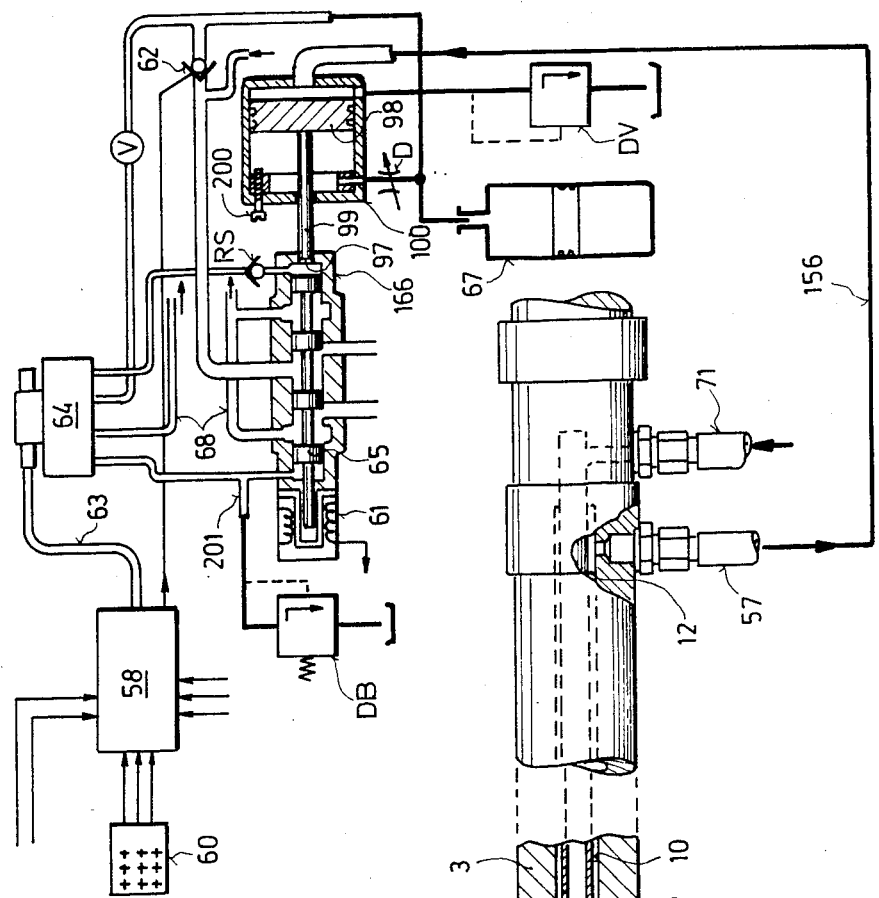
FIG. 4 shows a further modification, the damping arrangement of FIG. 1 being represented at enlarged scale.

The ram according to FIG. 4 comprises a piston rod 1 and a hollow, cup-shaped piston member 2, the free front surface of which being referenced 36. The piston rod 1 is multisectional and consists of a hollow shaft 3 and an inner piston 4 connected to the front end of the shaft and having a free front surface 8. A pressure chamber 9 of variable volume is defined between this free front surface 8 of the inner piston 4 and an inner surface of a front wall 7 of the piston member 2. An annular chamber 6 is formed between the outer circumference of the inner piston 4 and an enlarged inner bore 45 of the piston member 2, said annular chamber being engaged by an annular rib 5 of the inner piston 4, thus limiting relative movement enlarging the pressure chamber 9 between the piston rod 1 and the piston member 2. A tube 11, forming part of a supply conduit for a cooling and damping fluid (normally a liquid fluid) is rigidly mounted within a central longitudinal bore 10 of the shaft 3 of the piston rod 1, thereby forming an annular flow off and feed-back conduit 12 for the damping and cooling medium. The front end of the tube 11 is supported by a part 13 arranged within the piston rod and having a central bore 14 connected to the interior of the tube 11. The bore 14 discharges at right (with respect to FIG. 4) into a cylindrical chamber 15 of the inner piston 4.

In the embodiment shown in FIG. 4, a further cylindrical bore 16 of enlarged diameter joins to the bore 14 in the direction towards the pressure chamber 9 and is connected with the latter through a central bore 17. The bore 17 has a widening 18 in the region of the front surface 8 of the inner piston 4. The inner piston 4 has a radial channel 22 extending between the annular chamber 6 and the central bore 17. A further radial channel 21 starts from the central bore 17 opposite the discharge end of the channel 22 and discharges into a chamber 40 through a longitudinal bore 20 and a radial bore 19 of the inner piston 4, the chamber 40 being in connection with the annular feed-back conduit 12 of the shaft 3. The annular chamber 6 is, however, also in connection with the pressure chamber 9 by at least one axially extending notch 23 formed at the periphery of the inner piston 4. The passage area of the notch 23 decreases continually, e.g. according to a square-law, from the pressure chamber 9 to the rear.

This notch 23 forms a throttle valve in the above-mentioned flow-off conduit. It will be understood that the effective passage area of the notch 23 decreases continually with relative movement between the inner piston 4 and the piston member 2 in the sense of diminshing the volume of the pressure chamber 9, thus increasing the throttle action of this throttle valve.

A pressure-loaded abutment member 24, comprising a central longitudinal bore 25, is disposed within the cylindrical chamber 15 of the inner piston 4, the member 24 having a flange 26 at its end turned towards the pressure chamber 9. The front surface of the abutment member 24, turned towards the pressure chamber 9, has the shape of an outer cone and engages a corresponding surface of an annular part 38 into which at least one inclined bore 37 opens starting from the annular chamber 6. In this way, the outer cone of the pressure-loaded abutment member 24 forms a sealing surface blocking the orifice of this bore 37 in the neutral position shown. The cylindrical chamber 16 is formed by a widening of the central bore 25 of the pressure-loaded abutment member 24. A pressure spring 27 is provided for exerting the load and pops against the part 13.

A valve body in the form of an immersion slider 29 is axially displaceable in the bore 17 of the inner piston 4 starting from the cylindrical chamber 16. The immersion slide valve 29 has a neutral position defined by the engagement of a flange-shaped stop 30 at that end of the immersion slide valve 29, which is averted from the pressure chamber 9, with a rigid abutment surface 31 formed by a shoulder-like transition between the cylindrical chamer 16 and the bore 17 of the inner piston 4. In this neutral position of the immersion slide valve 29, a central bore 32 of the immersion slider is connected with the widening 18 within the front surface 8 of the inner piston 4 through a transverse bore 33.

The immersion slide valve 29 has two annular grooves 34 and 35 spaced from each other on its circumference. In the neutral position of the immersion slide valve, the annular groove 35, being more away from the pressure chamber 9, is connected with the radial channels 21, 22 of the inner piston 4, so that the feed-back conduit is open. Therefore, the cooling liquid, being under a predetermined working pressure and supplied through the tube 11 and the bores 14, 15, 25 16 and 32 to the pressure chamber 9, can freely flow off via the notch or throttle 23, the annular chamber 6, the radial bores 21 and 22, the interposed annular groove 35 and the bores 20, 19 to the annular feed-back conduit 12.

When the ram is moved out of its initial position (at right in FIG. 1) during the first injection phase at the beginning of a die-casting cycle, the immersion slide valve 29 remains first in its neutral position in accordance with the relationship of forces on its two axial end surfaces. Only when the ram is considerably accelerated at the transition from the slow pre-filling phase to the fast filling phase, the pressure of reaction (and also due to the increased resistance of the metal, when a constricted area 44 is provided), acting on the ram, is increasing in such a manner that the pressure of the supplied cooling liquid in the pressure chamber 9 exceeds the working pressure. In this way, the immersion slide valve 29 will be pushed back, i.e. to the right (with reference to FIG. 4).

In the course of this withdrawing movement, the immersion slide valve 29 assumes a position in which the pressure chamber 9 is sealed against the supply conduit and the feed-back conduit as well, since the transversal bore 33 of the immersion slide valve 29 is blocked by the walls of the bore 17 of the inner piston and the annular groove 35 is out of alignment with the radial channels 21 and 22. The cooling and damping liquid, thus trapped within the pressure chmber 9, is substantially incompressible and prevents to a high extent any further relative movement between the piston member 2 and the inner piston 4, so that the pressure in the pressure chamber will further increase. However, further withdrawing of the immersion slide valve 29 is precluded by the pressure spring 27 assisted by the pressure of the cooling liquid, because the flange 30 engages the front surface of the pressure-loaded abutment member 24. So, the ram continues advancing until the back-pressure acting onto its front surface 36 further increases to an end pressure which is still higher than the filling pressure. This is the case at the transition from the filling phase to the squeezing phase. A threshold pressure is determined by the force of the helical spring 27 and by the pressure of the cooling liquid. When this threshold pressure is exceeded by the end pressure, the spring 27 yields until the pressure-loaded abutment member 24 engages the part 13 of the piston rod 1. In this withdrawn position of the pressure-loaded abutment member 24, defined by the part 13, the second annular groove 34 is in alignment with the radial channels 21 and 22, so that the immersion slide valve 29 unblocks the feed-back conduit via the throttle valve 23 in this phase of the die-casting cycle, whereas the supply conduit remains blocked further, because the inner wall of the bore 17 of the inner piston 4 continues blocking the transverse bore 33 of the immersion slide valve 29. Since the feed-back conduit is unblocked, the piston rod 1 is enabled to displace to the left (with respect to FIG. 4) relative to the piston member 2 which results in a continuous decrease of the effective passage area of the throttle valve 23. Moreover, it is preferred, if the part 13, which supports the front end of the tube 11, is provided with at least one longitudinal bore 39 that is eccentrically located and by which the cylindrical chamber 15 is connected to the chamber 40 leading to the feed-back conduit 12 in the piston rod 1.

Therefore, when the abutment member 24 is pushed to the right against the pressure of the spring 27 and of the cooling liquid, the latter is enabled to flow additionally through the bore 37, the cylindrical chamber 15, the bore 39 and the chamber 40 off the annular chamber 6 and into the feed-back conduit 12. The movement of the inner piston 4 to the left is more and more suppressed so that the front surface 8 of the inner piston 4 will either practically not impinge upon the inner surface of the piston member 2 or if so, only in a braked manner.

In the embodiment of FIG. 1, an accelerometer 54 is mounted on the piston member 2 and is connected with a movable line 55. A preferred embodiment featuring the attachment of the accelerometer 54 and a substitution for the line 55 will be described later with reference to FIG. 3A.

Additionally or alternatively to the accelerometer 54, a pressure sensor 148 may be provided in the front wall 7 of the piston member 2 for measuring the pressure within the pressure chamber 9. This pressure sensor 148 may also be connected to a movable line 155, which is the reason why the arrangement of the accelerometer is preferred to the application of a sensor 148 in the front wall 7: Not only that there is a movable line (which could relatively easily be replaced by a wireless transmission in the manner described with reference to FIG. 3A), but additionally two bores are necessary in the piston member 2 which are hardly accessible. Moreover, a pressure sensor 148 just in the region of the front wall 7 has to be quite heatproof. Thus, it is better to arrange a pressure sensor 248 within (or connected to) a stationary section 56 of the entire feed-back conduit which is connected to the flow-off conduit 12 by a movable hose 57. Since the section 56 is stationary, a movable line, such as 155, is no longer necessary. It may be mentioned that usual control circuits for the drive cylinder unit 53 comprise a further pressure sensor 348 (in some cases also two of such sensors at both sides of the drive piston 52), the output signal 348' of which being represented in FIG. 2.

This signal 348' is normally used to control a control valve 66 for the drive cylinder unit 53 by feeding the signal 348' of the pressure sensor 348 to a control circuit or processor system 58 which may also receive the output signals of the sensors 48 and 49, as well as the output signal of a known position transducer 59 for the respective position of the piston member 2 and of its piston rod 1, and finally nominal value signals from a nominal value transmitter 60 which may be formed as a setting box with a plurality of setting knobs. Furthermore, the control circuit 58 may also receive a position signal from a coil 61 indicating the position of a valve body 65 of a valve 66 in order to control a controllable check valve 62 on the one hand, and a pilot valve 64 for the displacement of the valve body 65 of the control valve 66 through lines 63 on the other hand. The control circuit shown corresponds to a known realization in which the pilot valve 64 is connected to an accumulator 67, also connected to the controllable check valve, through a valve V. The valves 64 and 66 are provided with flow-off conduits 68, whereas the supply is effected by a pump P from a tank 69 for an appropriate hydraulic liquid to a line 70 and into the tube 11 via a hose 71.

The output signal of the pressure sensor 148 is either fed to the control circuit 58 or directly to the pilot valve 64, as indicated in dotted lines, suitably through a differentiating stage 72. The purpose of this measure will be explained later with reference to FIG. 2. In a similar manner, a differentiating stage or pulse shaper stage 172 may be connected to the output of the pressure sensor 248. Equally, the output signal of the accelerometer 54 is fed to the control circuit 58, suitably through a pulse shaper stage not shown.

Figure 2:
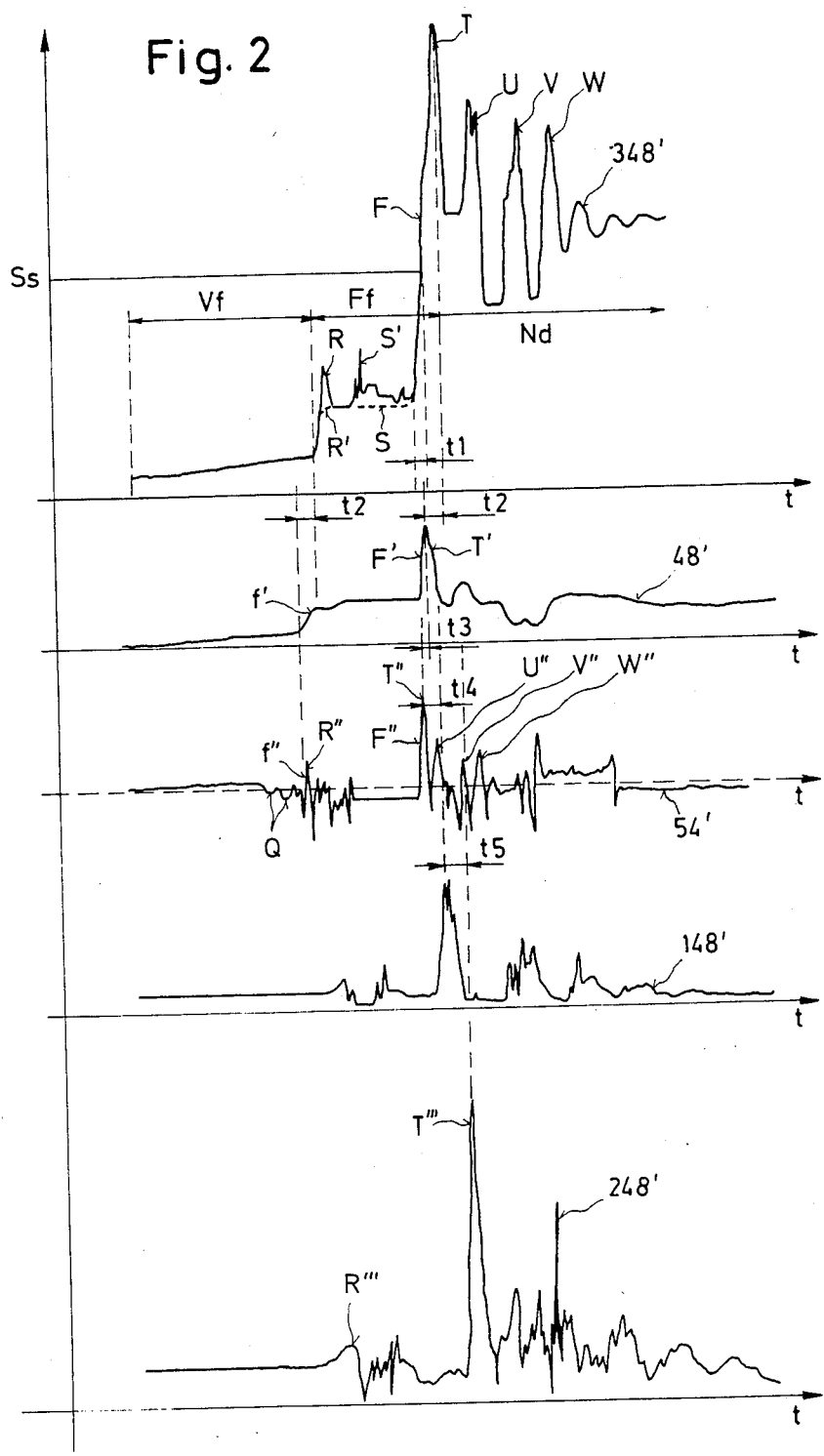
FIG. 2 represents different signal patterns derived from different sensors illustrated in FIG. 1.

In FIG. 2, the various output signals of the transducers 48, 54, 148, 248 and 348, shown in FIG. 1, are illustrated for the sake of comparison and have the same reference numeral as the transducer, but with a prime notation. From these signals, the signal 348' has already been repeatedly shown in an idealized manner in the literature, so that this signal may be better known than other signals and may facilitate a comparison. In the diagrams illustrated, time t is plotted on the abscissa, whereas on the ordinate there is the respective amplitude of the signal, i.e.—since it is the question of electrical transducers—a corresponding voltage which in the case of the signals 48', 148', 248' and 348' corresponds to a pressure and, in the case of the signal 54', to a positive or negative acceleration. All signals start substantially with the pre-filling phase without the first injection phase. This pre-filling phase Vf takes a longer period than the following filling phase Ff, since the latter is effected with higher speed. Then follows the squeezing phase Nd.

It is known that a pressure rise occurs at the transition from the pre-filling phase to the filling phase, the pressure rise being generally represented by a signal peak R. In fact, however, the presence of such a peak R depends upon the nature of the runner 45 (FIG. 1) and whether it is separated from the cavity 46 by a more or less constricted area 44 and how this area 44 is shaped, in the case it is present. Although the signal 348' is generally shown in the literature as assuming the course C (indicated in dotted lines) after the peak R, the example of the signal 348' of FIG. 2, which stems from a practical measurement, illustrates that also further peaks S' may occur without any further, which may be even higher than the peak R. Therefore, if the signal 348' is used for the control of the ram speed, one has to take into account that considerable interferences may occur, for which reason some safety measure has to be taken to reduce the speed of the control. For example, a relatively flat signal section R' will be obtained in the case of the absence of a constricted area 44 (FIG. 1), which—e.g. in addition to a possible signal pattern S'—would result in a highly unreliable control.

At the transition from the filling phase Ff to the squeezing phase Nd, a further signal peak T is obtained due to the suddenly rising pressure, the peak T being generally followed in the idealized illustrations of the literature by a flat signal section, similar to the section S, but on a higher level. In fact, however, considerable fluctuations of pressure may occur comprising peaks U, V and W, when there is a bad deceleration control and with absence of a damping arrangement for the ram unit 1, 2, 52, especially for the piston 2 (FIG. 1). The various pressure peaks S', U, V, and W in the course of the signal 348', which are not predictable, result from the non-use of a ram with a damping arrangement 1 to 40, as is usually the case. And this is the reason why the application of such a signal 348' in a control circuit involves various risks, as mentioned above, which lead to the necessity to provide a threshold value Ss well above the level of the peaks R and S' for the sake of safety for detecting the peak T. Since, however, the rise of the peak T begins already before, a time lag t1 is lost with respect to the speed of the control.

If one measured the pressure distribution on a undamped piston by means of the pressure sensor 48 (FIG. 1) rather than by the pressure sensor 348, the pressure signal is obtained at this location by a period t2 before which may amount, for example, to several milliseconds. The pressure signal obtained by the sensor 48 on an undamped ram would be very similar to the signal 348', but the flank of rise F would be not so high so that the peaks T, U, V and W would occur on a lower level, although clearly to distinguish. To the contrary, if one records the pressure signal 48' of a damped ram by means of the sensor 48. it appears that this signal 48' is considerably more smoothed in relation to the signal 348, so that the flanks of rise f' and F' are of a substantially greater significance and are of more use for a control. This is the reason why the combination of a damped ram with a control circuit for controlling the displacement of the ram is especially favorable per se due to the better distinguishable signal pattern, and particularly in the case of a pressure signal.

Considering the signal 54' of the accelerometer 54 (FIG. 1), however, it will be found that this signal 54' has a clear signal peak R'' at a very early moment, i.e. at a moment in which the flank f' of the signal 48' is just beginning. Certainly, the starting point of the flank f' may be determined at a relatively early moment by interposing a differentiating stage (corresponding to the stage 72 of FIG. 1), but by the same measure a signal could be derived from the signal 54' at a still earlier moment, particularly since it may be seen from FIG. 2 that smaller peaks Q are already present in the signal 54' relatively far before the beginning of the period t2. Thus, in such a signal 54', the ensuing peak R'' announces itself relatively soon.

After the pattern of the signal 54' has smoothened in the region of the section S, a sudden peak T'' appears even a period t3 before the peak T' of the signal 48'. This corresponds almost to the start of the period t1. In fact, the period t3 amounts to several tenths of a milisecond which facilitate, of course, the control of the displacement of the ram.

Figure 3:
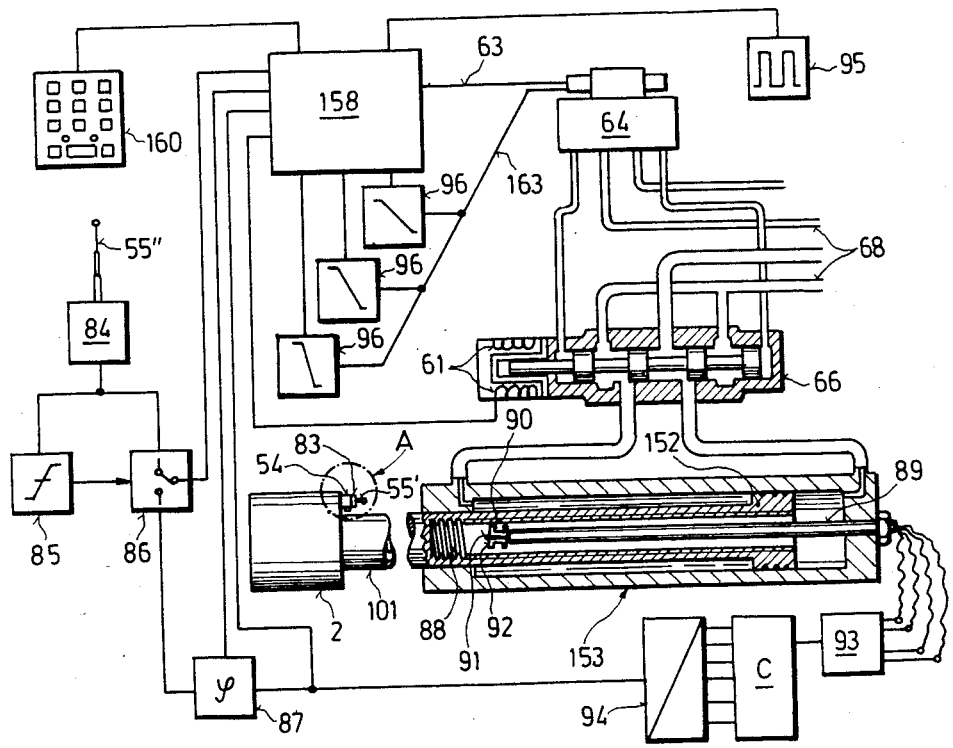
FIG. 3 shows a modification of the embodiment of FIG. 1, a detail A of which being illustrated in FIG. 3A at a considerably enlarged scale.
Figure 3A:
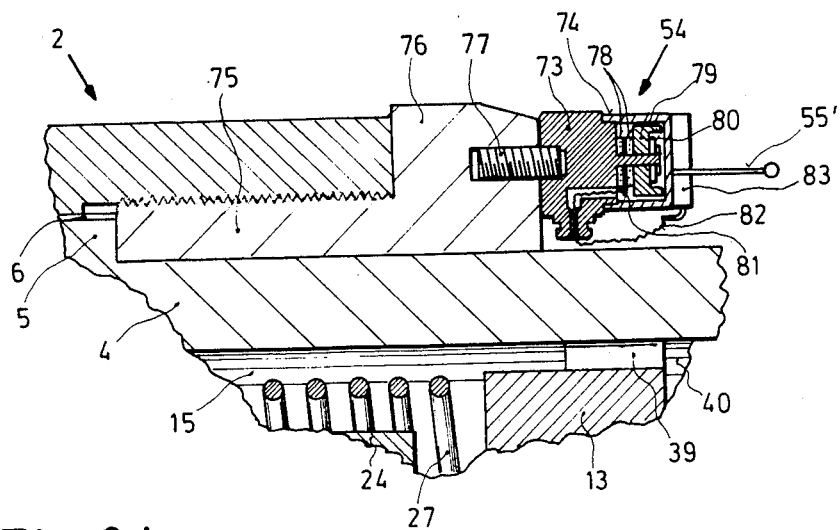

Thus, while the accelerometer 54 (FIG. 1) supplies a very useful signal 54' either in view of the early moment and with respect to the significance (at least if interferences are excluded by means of the damping arrangement 1 to 40), it may appear as a blemish that it is provided with a movable line 55. However, this problem can be solved by means of a wireless transmission of the signal, as illustrated in FIGS. 3 and 3A. From this point of view, the signal 54' is most favorable, and it should be compared in the following with those signals which are obtained at the remaining measuring points with the sensors 148 and 248 shown in FIG. 1.

When inspecting the signal 148' of the sensor 148, it will be found that it is temporarily later than the signal 54' and is shifted by a period t4. The reason is that fluctuations of the acceleration hardly influence the pressure within the damping arrangement 1 to 40, and only considerable variations cause afterwards a rise of pressure within the damping system. When this occurs, the pressure wave propagates—although within some milliseconds—nevertheless with a certain delay and attains the sensor 248 at a still later moment, so that the signal 248' undergoes a delay by a period t5 in comparison with the signal 148', thus amounting to a total delay of t4 plus t5. Nevertheless, the signal 248' has the advantage to supply a very distinct peak T''', as compared with its peak R''', so that it gives at least an unambiguous indication of the transition from the filling phase Ff to the squeezing phase Nd. In addition, the sensor 248 has still the advantage to lie in a place where there is no need for a movable line and which is easily accessible. Therefore, if it is shown in FIG. 1 that the sensor 248 is connected to the control circuit 58 through its pulse shaper state 172, although the signal peak T''' appears delayed by a period corresponding to the calculation [t4+t5−t3] with respect to the real end of the filling phase Ff (practically given with the appearance of the peak T' of the signal 48'), this is made for that reason, because the signal 248' may be useful for a lagging control from shot to shot of the piston 2, e.g. for adapting the nominal values (adaptive control). To the contrary, the signal 54' is preferably used for a real time control of the displacement of the piston 2 during a single shot. In such a real time control, conventional components may be used, particularly conventional valves, as represented in FIGS. 1 and 3, because the damping arrangement 1 to 40 leaves enough time for the control, even with a relatively slow operation of such valves, so that in some cases delaying time circuits have yet to be incorporated into the control circuit 58. In this way, expensive special designs for the electric and hydraulic components can be avoided, while there are provisions for incorporating safety measures for excluding an incorrect operation. Moreover, the damping arrangement acts as a smoothening energy capacitor for the signals by which the individual peaks contrast more unambiguous and clearer to the signal pattern.

The above explanation to the principal operation shall now be made more concrete with reference to a practically conceivable embodiment according to FIG. 3. In this, parts of the same function have the same numerals as in FIG. 1, parts of a similar function have the same reference numeral, but with a hundred added.

In the embodiment of FIGS. 3, 3A, only the accelerometer 54 is used among the various sensors shown in FIG. 1. According to FIG. 3A the accelerometer consists of a base 73 onto which a casing 74 is mounted in a manner not shown. As described above with reference to FIG. 4, the inner piston 4 has an annular rib 5 so that this piston 4 is displaceable between two end positions. The counter-abutment surface for the annular rib 5 is formed by the front surface of a collet 75 which may comprise an annular flange 76 according to the embodiment shown in FIG. 3A. A mounting screw 77 for the base 73 is screwed into this annular flange 76, so that the accelerometer 54 is safely secured to the piston member 2. The base 73 is engaged by at least one, in the case of the embodiment shown even two piezoelectric crystal elements 78 pre-stressed by a cup spring 80 via a cup-like member 79. The piezoelectric crystal elements 78 comprise at least one electrode 81 to which a wire 82 is soldered leading to an integrated circuit chip 83. The IC-chip 83 contains a transmitter IC known per se which is connected to a transmitting antenna 55'. This transmitting antenna 55' transmits the signals of the accelerometer 54 through the injection cylinder 50 (see FIG. 1). A receiver antenna 55" (FIG. 3) is situated in a manner to receive the signals from the antenna 55', for example by arranging the antenna 55" opposite the rear opening of the injection cylinder 50 (at right in FIG. 1). This receiver antenna 55" is connected to a receiver circuit 84, the output signal of which corresponds to the signal 54' (FIG. 2) and is fed either to a peak detector circuit 85 and to a switch over stage 86. The peak detector circuit 85 of FIG. 3 bears the symbol for a threshold value switch, and in fact, it may be designed as such a switch. In this case, the occurrence of the peak T" (FIG. 2) is determined in a similar way, as described with reference to the signal 348' and the threshold level Ss, whereby in the case of the signal 54', the threshold value has to be chosen such that it lies reliably above the level of the peak R".

This necessary reliability in the case of the signal 54' does not affect the speed of the control, because this signal appears before the real end of the filling phase Ff by a time interval t3. Moreover, also that time may be utilized which is at disposal due to the damped relative movement of the inner piston 4. In this connection it has already been mentioned that in some cases it may be necessary to provide even one or more delaying time circuits.

When it is desired, however, to utilize any chance to save time, it is also possible to use a differentiating stage as a peak detector circuit 85 in a similar way, as described with reference to the stage 72. In this case, a greater differentiating signal will be obtained due to the greater slope of the flank F" (FIG. 2) as compared, for instance, with the flank f", wherein the difference of the corresponding differentiating signals will be greater in any case than the difference of the peaks R" and T" themselves. Suitably a threshold value switch will, however, follow the differentiating stage for determining the magnitude of the peaks.

The output signal of the peak detector circuit 85 controls the switch over stage 86 which normally feds the output signal of the receiver circuit 84 to a processing system 158. Since the peaks U", V" and W"' (FIG. 2) which may follow the peak T" are not of interest for this processing system 158, the operation is such that the switch over stage 86 is actuated with the occurrence of the peak T", detected by the peak detector circuit 85, in such a manner that the output signal of the receiver circuit is then fed to a phase comparator 87.

In this embodiment, the rear portion of the piston rod 101, which is turned towards the drive piston 152, is hollow and may be provided with an internal thread 88 (only some individual threads are shown, although extending over the whole interior) or with another incremental code. The arrangement of a position transducer (and the internal thread 88 is a part of such a transducer) in a cavity of the piston rod 101 results in a reduced inertia, which fact affects the controller action of the ram unit 1, 101, 152 in a favorable manner. It should be reminded that the front portion of the piston rod 1 or 101 is also hollow for providing the supply and feedback conduits 11 and 12 (FIG. 4) so that the combination of a damping arrangement 1 to 40 with the control of the ram movement has a favorable effect to the latter also due to this reason.

For reading the incremental code, a magnetic head 90 is mounted on the end of a hollow rod 89, the magnetic flux of the head 90 being repeatedly interrupted and closed during movement of the piston rod 101. If desired, a second head 92 may be arranged separated from the first one by a shielding sheet 91, the head 92 being offset from the head 90 by half an incremental step, i.e. in this embodiment by half a pitch of the thread 88, for achieving a greater accuracy. Theoretically, it would be possible to arrange more than two heads, e.g. three heads being offset by a third of an incremental step.

Although similar incremental transducer arrangements have already become known for the outside of piston rods, and it has also been proposed to arrange analogue position transducers into a hollow piston rod, it is surprisingly that nobody has proposed to locate an incremental position transducer in the interior of a hollow piston rod 101 notwithstanding that this results in the benefits

- of an incremental transducer over an analogue transducer (greater reliability),
- of the accomodation at a location which is relatively safe against fouling and damages,
- of a reduced inertia of the ram 2, 101, 152, whereby it is no longer necessary to provide a non-magnetic protective coating, as is necessary at the outer surface of a piston rod for obtaining a seal relative to the cylinder unit 153.

It may be that the technical world hesitated heretofore to use such an arrangement (which, of course, is of advantage also independently whether a damping arrangement and a control is provided or not), because relatively large magnetic sensors have been used at the outer circumference of the piston rods. But this is by no means a condition, and to the contrary, it is not desirable for the accommodation in the interior of a hollow piston rod 101. Actually, the dimension of the magnetic heads depends not at last upon the pitch of the inner thread 88 which may be substantially finer at a protected place, as is the case in the embodiment of FIG. 3, than on the outer circumference. Moreover, it is possible and also preferred to provide another type of an incremental scale instead of the inner thread 88. It would be possible to use an optically readable scale, but the scale may be made relatively fine, if, for example, the interior of the hollow piston rod 101 is covered by a magnetic foil immovably held in the cavity of the rod 101. In such a case, it is particularly favorable if the magnetic foil is introduced free of such an incremental code and is fixed to the rod by cementing, by clips (not shown) or by any means. Then, usual recording and reproducing heads are inserted to assume a position, as shown in FIG. 3. These heads are first switched into their recording mode to record the incremental code, the respective signals being supplied by a clock oscillator of stabilized frequency. Afterwards, the ready-made position transducer of the drive unit 152, 153 need only be switched into its reproducing mode. This method, which implies recording the incremental code after the insertion of the record support into the cavity of the hollow rod 101, ensures that the position of the recorded incremental code relative to the magnetic head will not change, as would be the case, if the incremental code were recorded before the record support is fixed within the rod 101.

In any case, the signals of the magnetic heads 90, 92 may be fed through the hollow rod 89 to a pulse shaper circuit 93 which pass equally shaped pulses on a counter C. Preferably, the parallel outputs of the counter C are connected to a transformer stage 94 which supplies corresponding position signals to the processing system 158, so that an appropriate reference signal, indicating the actual position of the ram unit, is at disposal at least for the control of the first injection phase and the prefilling phase.

The output signal of the transformer stage 94 is also fed to the phase comparator 87 which, normally, is inactive until the peak T'' (FIG. 2) will appear. However, when the peak detector 85 has determined the occurrence of the peak T'' and actuates the stage 86 to switch over, the piston 2 will have reached its position 2' (FIG. 1) from which it cannot move in the first instance so that any further movement (see also the peaks U'', V'' and W'' in FIG. 2) of the piston rod 101 can only be relatively to the piston member 2 and result in a relative movement of the parts of the damping system which are displaceable relative to each other, i.e. particularly the piston member 2 and the inner piston 4. Therefore, it may be supposed for a short time that the output signals of the transformer stage 94 correspond to a relative movement of the displaceable parts 2 and 4, 101 after the occurrence of the peak T''. Now, the phase comparator 87 determines at which time the peak T'' appears in relation to the movement of the piston rod 101, i.e. at which point the actual position 2' is. Furthermore, since one can conclude from the speed of the relative movement of the parts 2, 4, 101 and the actual position 2' (FIG. 1) to the necessary deceleration of the ram unit 2, 101, 152, the output signals of the transformer stage 94 and of the phase comparator 87 could be used in the processing system 158 for calculating a corresponding negative acceleration for the drive piston 152 controlled by the valve 66. Therefore, it could be said that the pattern of deceleration, thus achieved, has been "bent" to be more steep or more flat. Since, on the other hand, calculator operations need a certain time, even with high clock frequency of a clock generator 95 which controls the processing system 158, it is more favorable to store the data of predetermined deceleration patterns of different slope in a memory system 96, from which they may simply be recalled and supplied to the pilot valve 64 through a line 163.

Preferably the processing system 158, which also may contain a calculator, executes a calculation of the speed of the parts 2, 101 being displaced relative to each other and of the time at disposal for the control until these parts have moved through the whole damping stroke and have reached their end position (i.e. the dead center or reversal point), using the signals of the incremental transducer 88 to 92, of the phase comparator 87 and of the clock generator 95. From the time, thus obtained, the response time is substracted which passes between the issue of the control command until the execution of it by the control valve 66, so that the optimal moment for the issuance of the control command may be determined. Of course, the electric transmission and processing of signals need also a certain time and should be considered.

However, there is a possibility to provide a still faster signal transmission, as will be described with reference to the embodiment of FIG. 4. In this embodiment, the hose 57, which is connected to the flow-off conduit 12, joins to a further flow-off conduit 156 that, however, doesn't lead to a tank (such as the tank 69 in FIG. 1), but is immediately used for the control of the control valve 166. This may be done, in principle, in that the control valve 166 has an axial bore 97 onto which the conduit 156 is directly connected. In this case, the cooling circulation would be interrupted, as long as there are not special measures which cause an operation in which the cooling circulation is only interrupted when the peak T' (FIG. 2) appears and the pressure signal of the liquid is fed to the control valve 166 for changing over the same. Such measures could consist in branching the conduit 156 to a tank (see tank 69 in FIG. 1), whereby this branch contains a check valve which is normally open (e.g. under the force of a spring) to allow the liquid to circulate to the tank. When the peak T' appears, the check valve is closed so that the pressure wave is guided to control valve 166.

In order to shield the valve 166 against excessive pressure pulses and to ensure appropriate adjustment facilities, a push rod 99, connected to a piston 98, may project into the opening 97. The piston 98 is displaceable within a cylinder 100, its left-hand end position being limited, if desired, by an adjustable stop, e.g. formed by a screw 200. The accumulator 67 is connected to that side of the cylinder 100 which is turned towards the control valve 166, suitably through an adjustable throttle valve D. The adjustment is made in such a manner that normally the pressure of the fluid-flowing through the throttle valve D into the cylinder 100 is just sufficient to keep the piston 98 in its right-hand initial position, as shown in FIG. 4. At the transition from the filling phase to the squeezing phase, the damping arrangement 1 to 40 damps the ocurring pressure peak, and it has already been mentioned above that the immersion slide valve assumes thereby a position in which the pressure chamber 9 is separated from the supply conduit 11. This is also a reason why the design of the damping arrangement 1 to 40, as in FIG. 4, is particularly favorable, because otherwise a corresponding valve had just to be provided to prevent a flow-back of the fluid through the respective supply conduit. Thus, the hydraulic pressure signal is enabled to become fully effective onto the piston 98 via the flow-off conduit 12, the hose 57 and the conduit 156, the piston 98 assuming then its left-hand position where it abuts against the screw 200. In other constructions, it may be necessary to provide two different end positions, and in such cases the screw 200 may be replaced by a piston rod of a digitally controllable cylinder unit.

When the piston 98 abuts the screw 200 (in general, several screws, e.g. three, may be distributed over the circumference of the cylinder 100), also its push rod 99 is displaced at left, the valve body 65 of the control valve also assuming its left-hand end position. This position is the squeeze initiating position of the control valve 166 inwhich the movement of the ram unit is decelerated so that less additional hydraulic fluid is supplied to the drive piston (vide 52 in FIG. 1). It should be noted that the valve body 65 assumes a right-hand filling initiating position at the transition from the pre-filling phase to the filling phase, when the ram shall be accelerated.

The displacement of the push rod 99 to the left (with reference to FIG. 4) increases the pressure within that chamber of the control valave 166 which is connected with the opening 97. Since the pilot valve 64 is controlled by the control circuit 58, it is clear that consequences to the pilot valve should be avoided. Therefore, the pilot valve 64 has to be kept free of additional pressure and has to be relieved. This can simply be done on the pressure side, i.e. the side of the push rod 99, by providing a check valve RS, because an increase of pressure in the chamber in front of the push rod 99 only leads to the desired displacement of the valve body 65 to the left. It is suitable, however, if an evading facility is also provided on the left side of the control valve 166 for the liquid being there. This could simply be done by arranging an expendable pressure bagin a branch conduit 201, but it is preferred to use a relief valve jet DB.

When the pressure peak, corresponding to the peak T' (FIG. 2), is faded out, the pressure of the accumulator 67 through the throttle valve D overcomes the pressure at the right side of the piston 98, this side of the cylinder 100 suitably being connected to a further relief valve jet DV. This relief valve jet DV is slow-operating so that the pressure signal, arriving through the conduit 156, comes fully into effect. However, it likewise conceivable to design the valve DV as a valve controllable by the pressure signal T' (FIG. 2), so that the valve DV opens only then, when the piston 98 has already been displaced to the left. Furthermore, it is conceivable to design both valves RS and DB as being controllable by the hydraulic pressure signal corresponding to the peak T', so that, for example, the valve RS is closed and the valve DB is opened, when the pressure peak T' appears.

Figure 5:
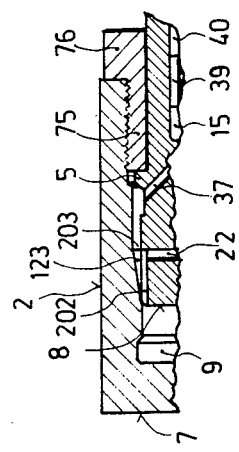
FIG. 5 shows a modification of a throttle valve device of the damping arrangement in an illustration similar to FIG. 3A.

A particular advantageous modification of the damping arrangement, shown in FIG. 4, may be seen from FIG. 5. In this embodiment, instead of an axial notch 23 (FIG. 4) of the inner piston 4, at least one axial notch 123 is provided within the wall of the piston member 2. Whereas the cross-sectional area of the notch 23 of FIG. 4 increases towards the pressure chamber 9, this area of the notch 123 decreases towards said chamber. Thus, if a notch of other dimensions is desired—may be for altering the damping characteristic in general, may be for adapting it to the control or to the product to be manufactured—it is merely necessary to exchange the piston member 2 which is much simpler and cheaper.

To ensure that there remains a connection between the pressure chamber 9 and the radial channel 22, even if the surface 8 is displaced to the left, suitably a connecting passage is provided, particularly in the form of a longitudinal recess 202 which extends from the pressure chamber 9, but ends before a control edge 203 acting as a limiting area together with the opposite notch 123 to form the throttle valve.

Numerous modifications are considered to be within the scope of the invention; for example, instead of the pressure sensors 48, 148, 248 or of the accelerometer, a position transducer may be provided for measuring the relative movement between the piston member 2 and the inner piston 4, e.g. in the form of an ultrasonic range finder measuring the distance between the front surface 8 of the inner piston and the inner surface of the front wall 7. Such a system could also be applied in the case of an embodiment according to FIG. 3 for determining the speed of this relative movement. In the latter case, however, it is suitable to design the evaluating circuit, connected to the ultrasonic range finder in accordance with the design of a Doppler radar. Of course, it will be understood that likewise any other kind of measurement for relative movement may be applied.

A further modification could be that in the embodiment of FIG. 4, an abutment element, e.g. corresponding to the screw 200, may also be arranged at the right side of the piston 98.

In cases in which the left-hand end position of the inner piston 4 (with reference to FIG. 4) is limited by the engagement of the front surface 8 with the front wall 7, it may be beneficial, if the immersion slide valve 29 projects beyond the front surface 8 so that it is forcibly displaced to and kept at the right, when the surface 8 engages the front wall 7. It has already been mentioned that the damping arrangement could be situated within the drive piston 52 instead of the piston 2 (for instance in injection molding machines for plastics). Likewise, the damping arrangement could be located between the pistons, e.g. to make the components more accessible. For example, a damping arrangement may be accomodated with a coupling 1a (only generally indicated in FIG. 1) between the piston 2 and the drive piston 52. It is also possible to arrange plural damping arrangements in the ram unit.

What we claim is:

1. An injection unit for injecting molten material into a cavity, beginning with a pre-filling phase, in which the molten material is shot through an entrance of a cavity, followed by a filling phase, which lasts until the cavity is filled up and the resistance of the material against further injection increases, and thereafter for maintaining the molten material in the cavity under pressure during a squeezing phase, said injection unit comprising;

injection sleeve means for receiving said molten material;

injection ram means movable within said injection sleeve means;

drive cylinder means;

drive piston means movable within said drive cylinder means and being releasably connected to said injection ram means to form a ram unit;

control means for controlling the movement of said ram unit during said phases, said control means including control valve means connected to said drive cylinder means and assuming a predetermined filling initiating position at the transition from the pre-filling phase to the filling phase, and assuming a predetermined squeeze initiating position at the transition from the filling phase to the squeezing phase to achieve a deceleration of said ram unit of a predetermined deceleration characteristic;

damping means arranged on said ram unit for absorbing shocks arising from the kinetic energy of masses which are decelerated at least at the transition from the filling phase to the squeezing phase, said damping means allowing a relative movement of said injection ram means with respect to said drive piston means; and signal transfer means interconnecting said damping means and said control valve means for changing over the latter to one of said initiating positions within a predetermined response time.

2. Injection unit as claimed in in claim 1, wherein said damping means comprise damping cavity means;

storing means for a damping liquid; and interconnecting means for said damping cavity means and said storing means, said interconnecting means including valve aperture means.

3. Injection unit as claimed in claim 2, wherein said injection ram means comprise an injection piston, and said damping cavity is arranged within said injection piston.

4. Injection unit as claimed in claim 3, further comprising feed-back conduit means interconnecting said damping cavity means and said storing means independently from said interconnecting means for enabling said liquid to be fed back from said damping cavity means to said storing means, thus establishing a circuit for said liquid flowing through said interconnecting means to said damping cavity for cooling said injection piston and then flowing back to said storing means through said feed-back conduit means.

5. Injection unit as claimed in claim 2, further comprising feed-back conduit means interconnecting said damping cavity means and said storing means independently from said valve aperture means for enabling said liquid to be fed back from said damping cavity means to said storing means, thus establishing a circuit for said liquid flowing through said valve aperture means to said damping cavity;

throttle valve means arranged within said feed-back conduit means and forming a passage of variable cross-section for said liquid; and valve means arranged within said interconnecting means.

6. Injection unit as claimed in claim 5, wherein said ram unit comprise injection piston means and piston rod means, said throttle valve means being arranged within said injection piston means whereas said valve means are located within said piston rod means.

7. Injection unit as claimed in claim 5, wherein said valve means are also arranged within said feed-back conduit for controlling the same behind the throttle valve means, when seen in the direction of flow.

8. Injection unit as claimed in claim 2, wherein said signal transfer means comprise fluid conduit means connected to said damping cavity means for transferring a fluidic pressure signal to said control valve means.

9. Injection unit as claimed in claim 8, further comprising valve means arranged within said interconnecting means for preventing evading of said damping liquid with occurrence of said fluidic pressure signal.

10. Injection unit as claimed in claim 8, further comprising cylinder-and-piston means including piston rod means and being interconnected between said fluid conduit means and said control valve means, said control valve means comprising a valve body to be biased by said piston rod means at the occurrence of said fluidic pressure signal.

11. Injection unit as claimed in claim 8, further comprising second control valve means being in fluid connection with said first control valve means; and pressure relief means interconnected with said first and second control valve means for preventing compressive load to act upon said second valve means when said valve body is biased by said piston rod means.

12. Injection unit as claimed in claim 11, wherein said second valve means comprise a pilot valve controlling the position of said valve body.

13. Injection unit as claimed in claim 11, wherein said pressure relief means comprise a valve.

14. Injection unit as claimed in claim 13, wherein said valve is formed by a check valve.

15. Injection unit as claimed in claim 1, wherein said signal transfer means comprise sensor means for providing a signal indicative for the increase of resistance against further injection.

16. Injection unit as claimed in claim 15, wherein said damping means comprise:

damping cavity means;

storing means for a damping liquid; and interconnecting means for said damping cavity means and said storing means, said interconnecting means including valve aperture means;

and said sensor means comprise pressure transducer means exposed to the pressure of said liquid.

17. Injection unit as claimed in claim 16, wherein said storing means comprise:

tank means for said liquid;

rigid conduit means connected to said tank means, as to convey said liquid; and flexible conduit means interconnecting said rigid conduit means and said ram unit;

said pressure transducer means being connected to said rigid conduit means.

18. Injection unit as claimed in claim 15, wherein said sensor means comprise measuring means for said relative movement and providing an output signal indicative for said relative movement.

19. Injection unit as claimed in claim 18, further comprising: calculating means arranged to receive said output signal for carrying out the following calculations:

(a) calculation of the delay until the relative movement of said injection ram means and said drive piston means will reach a final position, and (b) subtraction of said predetermined response time from delay to obtain a resultant time;
said signal transfer means being electric and providing a change over signal for said control valve means at the end of said resultant time after the occurrence of said output signal.

20. Injection unit as claimed in claim 15, wherein said sensor means comprise accelerometer means.

21. Injection unit as claimed in claim 15, further comprising: differentiating means for said signal.

22. Injection unit as claimed in claim 15, further comprising:
position transducer means for providing a signal indicative of the position of said ram unit;
coincidence determining means for determining the position of said ram unit at the occurrence of the increase of resistance determined by said sensor means, said coincidence determining means including:
a first input connected to said sensor means,
a second input connected to said position transducer means; and
an output;
signal processing means connected to the output of said cocoincidence determining means for determining said predetermined deceleration characteristic.

23. Injection unit as claimed in claim 22, wherein said signal processing means comprise computing means for computing said predetermined deceleration characteristic.

24. Injection unit as claimed in claim 22, wherein said signal processing means comprise at least one storage means for storing datas relating to at least one predetermined deceleration characteristic.

25. Injection unit as claimed in claim 1, wherein said signal transfer means are arranged to control said squeeze initiating position.

* * * * *